United States Patent [19]
Tash

[11] Patent Number: 6,062,262
[45] Date of Patent: May 16, 2000

[54] WATER DRAIN PIPE TEST PLUG DEVICE

[76] Inventor: George Tash, 5777 Balcolm Sangon, Simols, Calif. 93021

[21] Appl. No.: 09/114,710

[22] Filed: Jul. 13, 1998

Related U.S. Application Data

[63] Continuation of application No. 08/540,436, Oct. 10, 1995.

[51] Int. Cl.[7] .................................................. F16L 55/10
[52] U.S. Cl. ................................. 138/89; 138/94; 138/92
[58] Field of Search ................................ 138/89, 90, 93, 138/92, 94

[56] References Cited

U.S. PATENT DOCUMENTS

| | | | |
|---|---|---|---|
| 2,198,854 | 4/1940 | Behringer | 138/94 |
| 2,327,615 | 8/1943 | Ankarlo | 138/89 X |
| 2,373,242 | 4/1945 | Glashow | 138/89 |
| 3,019,819 | 2/1962 | Ankarlo | 138/94 X |
| 3,154,106 | 10/1964 | Ver Nooy | 138/94 |
| 3,626,475 | 12/1971 | Hicks | 138/94 |
| 3,665,966 | 5/1972 | Ver Nooy | 138/93 |
| 3,774,646 | 11/1973 | Smith | 138/93 |
| 4,040,450 | 8/1977 | Boundy | 138/94 |
| 4,202,377 | 5/1980 | Harrison | 138/94 |
| 5,082,026 | 1/1992 | Smith | 138/89 X |
| 5,297,581 | 3/1994 | Godfrey | 138/94 |

*Primary Examiner*—Patrick Brinson
*Attorney, Agent, or Firm*—Lyon, Harr & DeFrank, LLP; Richard T. Lyon

[57] ABSTRACT

The improved water drain pipe test plug device includes an elastomeric solid drain plug which is resilient and flexible and is in the form of a disc. The disc has a front surface and an opposite parallel rear surface connected thereto by a peripheral annular rim. The disc has a leading end and a trailing end, the rim at the leading end sloping rearward and inwardly and the rim at the trailing end being parallel thereto. An arcuate spacing plate is connected to the disc front surface and a pressure plate is connected to the disc's rear surface. The pressure plate, in turn, is connected to a generally laterally extending elongated lever arm having a slot extending up therethrough. A pivot arm is rotatably connected to and depends below the lever arm, terminating in a bottom foot which is adapted to support the device on the lower edge of a drain pipe access hole. A lock arm bearing at least one and preferably two notches in its upper surface is rotatably secured to the pivot arm and is spring biased toward the notch. Engagement of the single notch in the slot against the lever arm fully locks the disc into a position which completely plugs the drain pipe. Where a second notch is present, when it is engaged the disc is moved to a position where the trailing end thereof is spaced away from the adjacent wall of the drain pipe to permit slow drainage of the pipe.

32 Claims, 9 Drawing Sheets

WATER DRAIN PIPE TEST PLUG DEVICE

This application is a continuation of application Ser. 08/540,436 filed Oct. 10, 1995.

BACKGROUND OF THE INVENTION

1. Field of the Invention

The present invention generally relates to plumbing devices and more particularly to an improved device for temporarily plugging drain pipes in order to test the same.

2. Prior Art

When a new home, condominium or apartment house or the like is constructed, the drains must be tested for leaks before they can be approved by an inspector. This is usually accomplished by first inserting a temporary plug device through the clean-out pipe located outside the structure to a point where it intersects a sewer line running from the structure drain to the main sewer line.

Such plug device usually is a long hollow expandable sausage-like unit which has a nipple at one end through which air or another gas is introduced into the unit until the unit expands sufficiently in diameter so that one end thereof blocks the clean-out pipe and the other end thereof seals off the sewer line. Water can then be introduced into the house drain and sewer system to check for leaks.

Such a conventional plug device has several drawbacks. Thus, such device is usually difficult to slide into place and to retrieve, due to its shape. Moreover, when the device is deflated, the fluid from the house drains not only flows into the sewer line but also backs up through the clean-out pipe, especially in multi-storied structures, creating a sanitation hazard. In addition, if the device is subjected to excessive pressure during use, it will rupture, with possible serious injury to workmen and the plumbing and sewage system.

Improved gas-expandable drain pipe plug devices have been devised by the present Applicant and are set forth in U.S. Pat. Nos. 4,660,603 and 4,790,356. Those devices overcome many of the drawbacks described above for conventional drain plugs.

However, there remains a need for a further improved drain pipe plug device which does not depend on introduction of gas therein to expand the device, since in some instances the use of gas is inconvenient. Such device should not be subject to rupture and possible injury to workmen and the structure drain pipe and sewage system. Preferably, it should provide means for bleeding off the head of test water in the drain pipe after the test thereof is completed, so that the test water does not gush out the drain pipe access hole or clean-out pipe through which the device has been introduced, when the device is removed therefrom.

Moreover, the improved device should be simple, durable, inexpensive, capable of being operated by a single workman and have a positive locking means indicating it is in the full operative position so that the test can begin.

SUMMARY OF THE INVENTION

The improved water drain pipe test plug of the present invention satisfies all the foregoing needs. The device is compact, light in weight, durable, inexpensive and easy to use. It effectively seals off a drain pipe with a positive locking mechanism and is easily removed after the test is completed.

In a preferred embodiment, it also includes means for slowly bleeding off the head of test water in the drain pipe above the device, so that the device can be safely removed from the drain pipe without having test water gush out the access port for the drain pipe into which the device has been inserted.

The device is substantially as set forth in the ABSTRACT OF THE DISCLOSURE. Thus, the device comprises an elastomeric, solid, resilient, flexible, self-supporting drain pipe plug in the form of a disc. The disc has substantial thickness and may be circular in plan view, or may have any other suitable shape such as elliptical, with flat parallel front and rear surfaces and a peripheral annular rim. The rim has a leading end and a trailing end, the rim at the leading end sloping rearwardly and inwardly and the trailing end being parallel thereto. Accordingly, the disc in side elevation is a parallelogram.

An arcuate spacing plate or hoop is secured to the front surface of the disc and extends forwardly thereof. The spacing plate helps to accurately position the plug in a drain pipe. A pressure plate is connected to the rear surface of the disc and in one embodiment forms the uppermost and front portion of an elongated hand-operated lever arm, the remainder of which extends generally laterally of the disc for manipulating the disc into and out of operative position in a drain pipe.

A pivot arm is rotatably secured at one end thereof to the mid portion of the lever arm adjacent to a generally vertical slot extending through the lever arm. The remainder of the pivot arm depends below the lever arm.

A lock arm bearing one and preferably two spaced notches in the upper surface thereof is rotatably secured to the pivot arm sufficiently close to the lever arm slot so that the lock arm can extend through the slot for releasable engagement with the lever arm. A spring is disposed around the pivot arm and lock arm to bias the latter towards the slot. The lower end of the pivot arm has a foot for supporting the device on the lower edge of a drain pipe access hole in the side of the drain pipe.

Engagement of the single notch, or in the case of a two notch configuration, one of the two notches, with the lever through its slot fully locks the disc into a position which completely plugs the drain pipe.

Where a second notch is present, when such second notch is engaged with the lever arm through its slot, the disc is moved into a position where the trailing end thereof is spaced away from the adjacent portion of the drain pipe wall on the side thereof remote from the access hole. This permits test water above the disc in the drain pipe to be bled down the drain pipe without gushing out the access hole. Such test water can be totally drained from the drain pipe before removing the device from the drain pipe after the test. This assures that such test water will not come out the access hole with the device removed therefrom.

Accordingly, the present device has an improved function over conventional drain pipe plug devices. The present device can be easily maneuvered into and out of sealing position in the drain pipe with a minimum amount of effort and is strong, effective and durable. Further features of the device of the present invention are set forth in the following detailed description and accompanying drawings.

DRAWINGS

Figure 1:
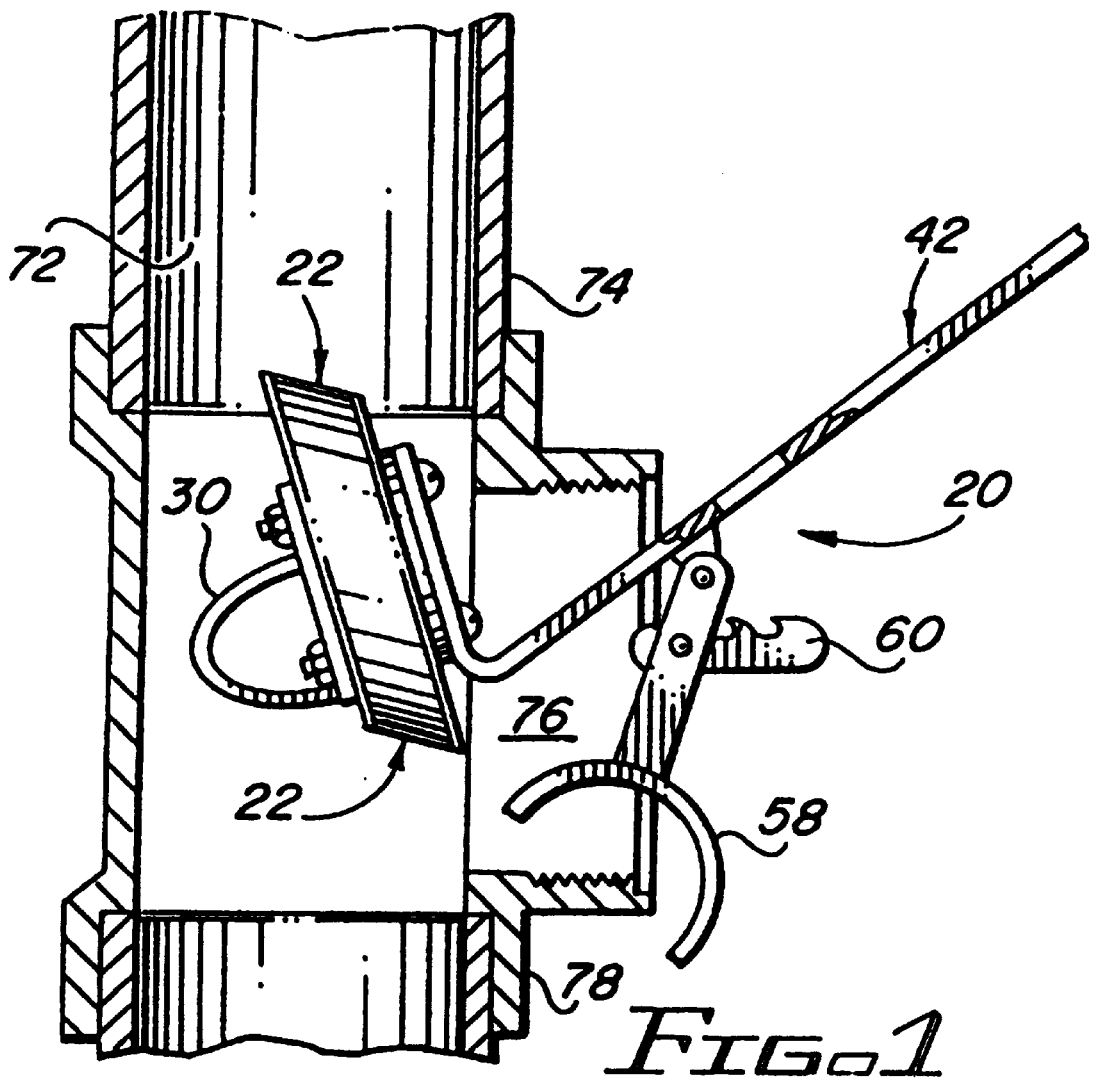
FIG. 1 is a schematic side elevation, partly broken away and partly in section, of a first preferred embodiment of the improved water drain pipe test plug device of the present invention, showing the device as it is being inserted into a drain pipe through the pipe's access hole said device having a two notch lock arm.
Figure 2:
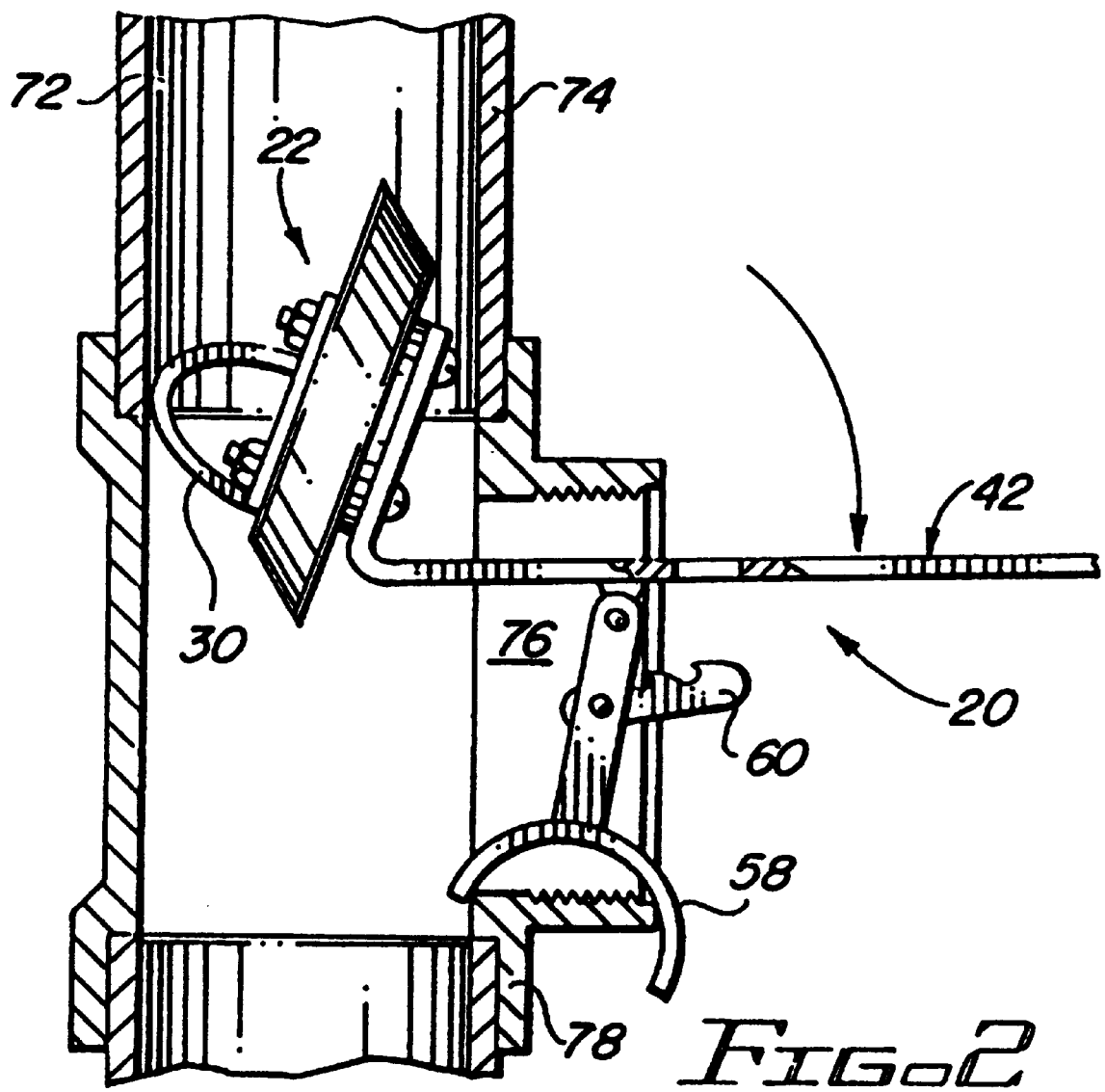
FIG. 2 is a schematic side elevation, partly broken away and partly in section, of the device of FIG. 1, showing the device seated on the lower edge of the drain pipe access hole and almost in operative position within the drain pipe.

DETAILED DESCRIPTION
FIGS. 1–5

Now referring more particularly to FIGS. 1–5 of the drawings, a first preferred embodiment of the improved water drainpipe test plug device of the present invention is schematically depicted therein.

Thus, device 20 is shown which comprises an elastomeric, flexible, resilient, solid self-supporting elliptical disc 22 of substantial thickness. The disc 22 may be circular, or may have any other suitable shape such as elliptical, as shown in the drawings. Disc 22 has a flat front surface 24 and a parallel flat rear surface 26, as well as a peripheral annular rim 28. An arcuate spacing plate or hoop 30 is connected to and projects forwardly of surface 24. For this purpose, plate 30 is integrally connected to a flat base 32, in turn secured to surface 24, as by spaced bolts 34 passing through disc 22 and nuts 36 threaded on bolts 34.

Figure 5:
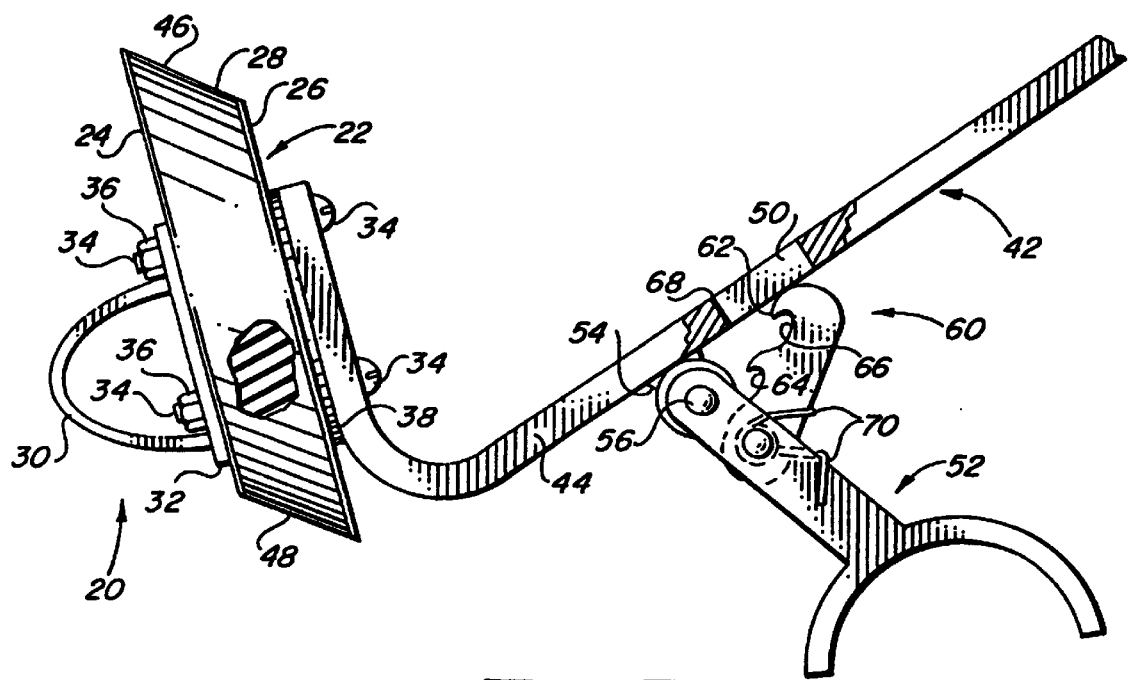
FIG. 5 is a schematic side elevation, partly broken away, of the device of FIG. 1.
Figure 6:
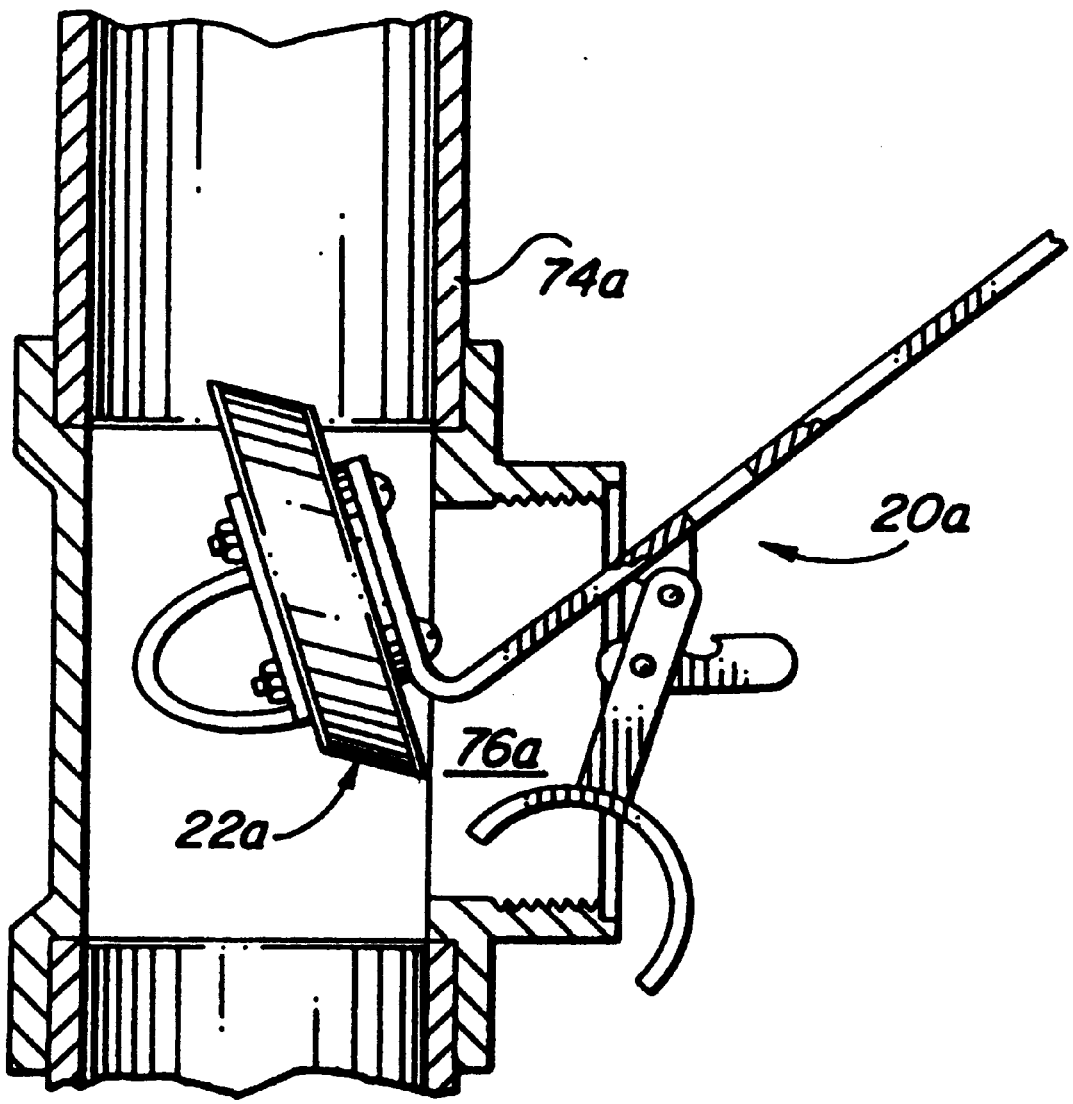
FIG. 6 is a schematic side elevation, partly broken away and partly in section, showing a second preferred embodiment of the improved water drain pipe test plug device of the present invention inserted into a drain pipe through its access hole, said embodiment having a single notch lock arm.
Figure 7:
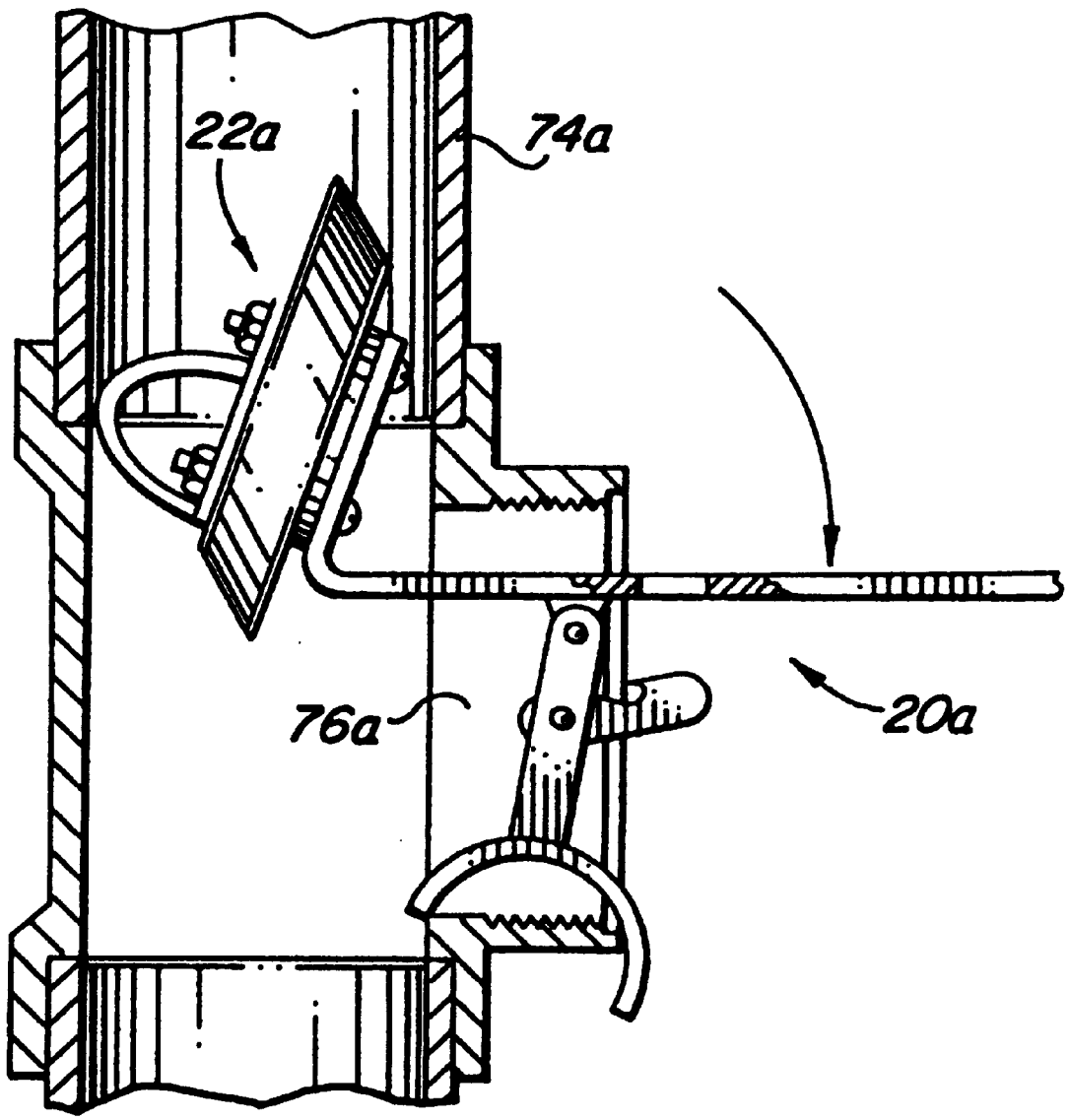
FIG. 7 is a schematic side elevation, partly broken away and partly in section, showing the device of FIG. 6 seated on the lower edge of the access hole.
Figure 8:
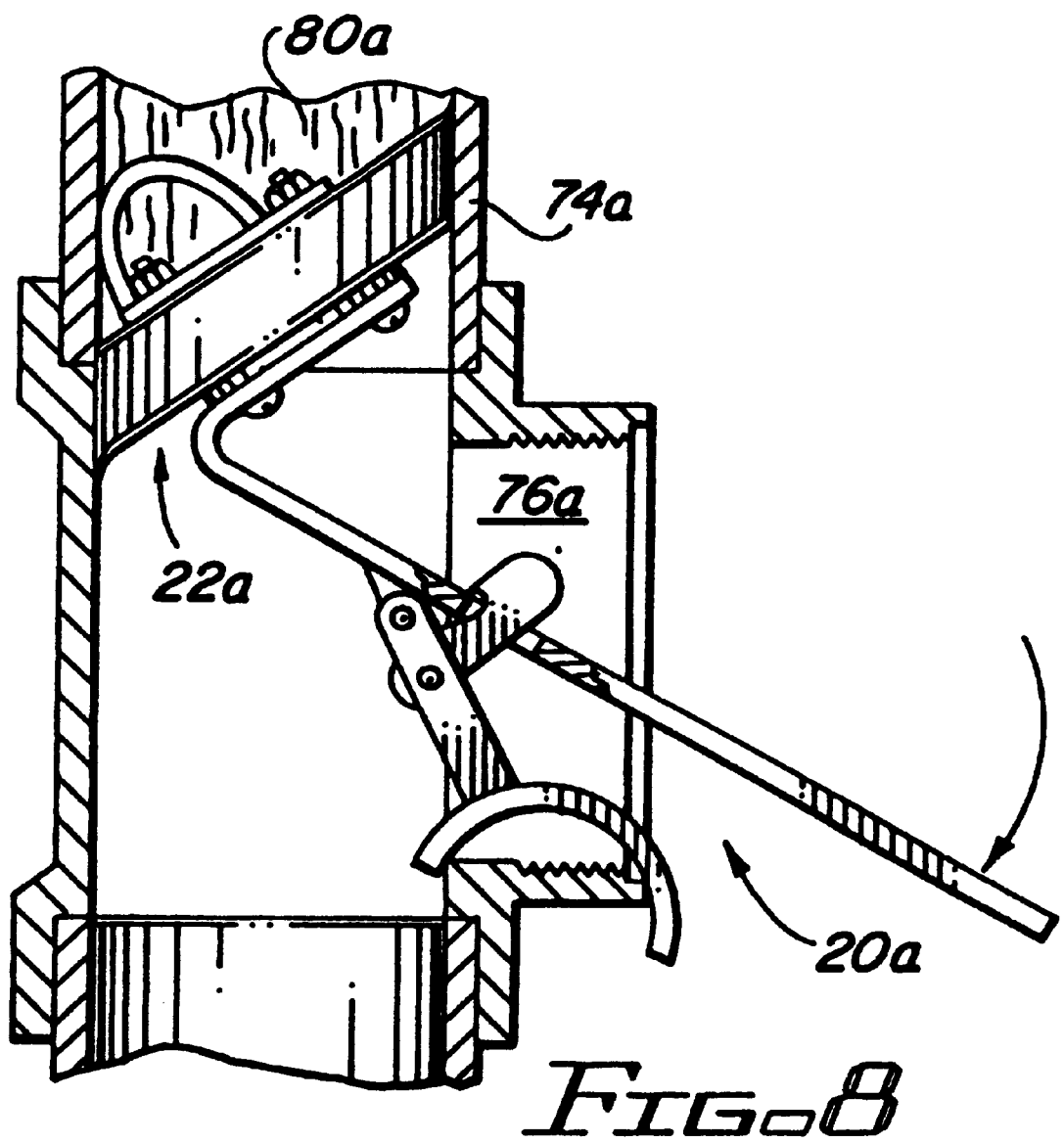
FIG. 8 is a schematic side elevation, partly broken away and partly in section, showing the device of FIG. 6 in the locked operative position completely blocking the drain pipe; and, FIG. 9 is a schematic side elevation, partly broken away, of the device of FIG. 1.
Figure 9:
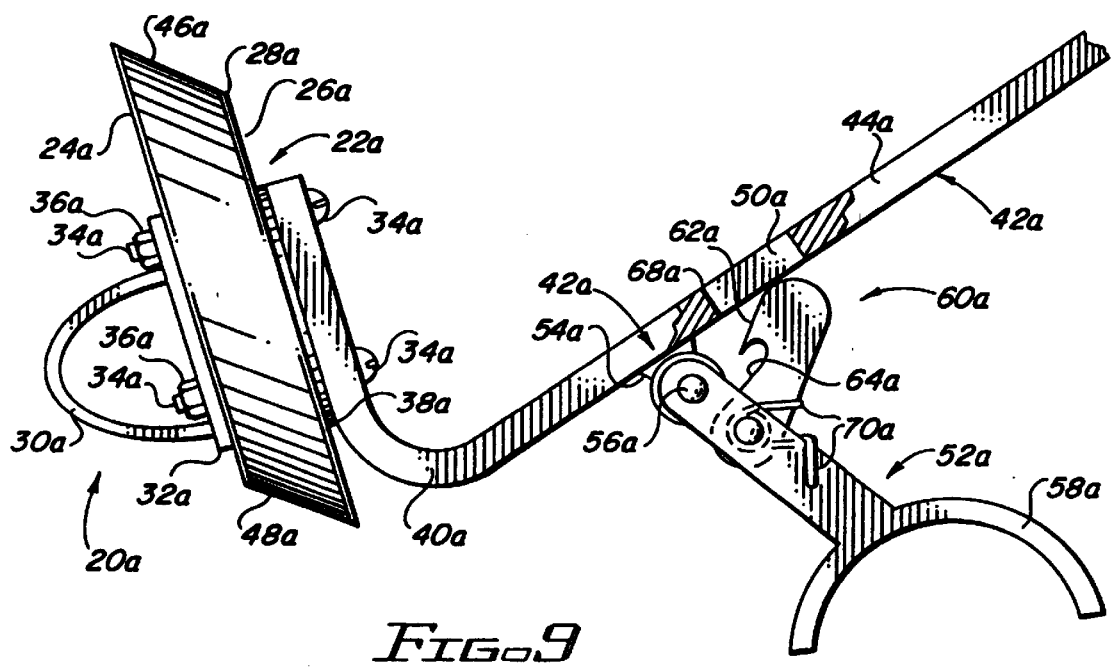

Rear surface 26 of disc 22 has secured thereto a flat pressure plate 38 abutting the short upper portion 40 of a lever arm 42. Portion 40 of arm 42 is integral with a longer generally laterally extending lower portion 44 of arm 42, giving arm 42 a generally L-shaped configuration in side elevation. Disc 22, plate 38 and portion 20 are all joined together by bolts 34 and nuts 36, as shown in FIG. 5.

The upward angle of portion 40 causes disc 22 to assume a similar position so that disc 22 has a leading end 46 and a trailing end 48. It will be noted that disc 22 in side elevation (FIG. 5) has the configuration of a parallelogram, rim 28 at leading end 46 sloping rearwardly and at an angle of less than 90° with respect to surface 24, and rim 28 at trailing end 48 being parallel to rim 28 at leading end 46. This facilitates maneuvering disc 22 into and out of sealing position, as shown in FIGS. 1–4.

Portion 44 of arm 42 defines a longitudinal slot 50 extending vertically therethrough at about the mid-point thereof. The upper end of a pivot arm 52 is secured to the underside of portion 44 by a depending stud 54 and a cross-pin 56 for rotation of arm 52 below portion 44 in a vertical plane. The opposite lower end of pivot arm 52 bears an integral foot 58, preferably in the form of a downwardly directed open arc.

One end of an elongated lock arm 60 is rotatably secured to pivot arm 52 at a point sufficiently close to slot 50 so that the opposite end of lock arm 60 can swing through a vertical plane and contact slot 50. In this regard, the upper surface 62 of lock arm 60 defines a spaced pair of notches 64 and 66 therein. Lock arm 60 and notches 64 and 66 are dimensioned so that notches 64 and 66 can pass up through slot 50 and engage lever arm in the area indicated in FIG. 5 as 68. A spring 70 is connected to pivot arm 52 and lock arm 60 to bias lock arm 60 up towards portion 44 of lever arm 42.

As shown in FIG. 1, device 20 can be introduced into the passageway 72 in drain pipe 74 through an access hole 76 defined by a rim 78 in one side of drain pipe 74, from which rim 78 a cap (not shown) has been temporarily removed. As lever arm portion 44 is moved down in the direction of the arrows in FIGS. 1, 2 and 3, foot 58 seats on the lower edge of rim 78 and disc 22 is rotated up and into a locked position (FIG. 3) totally blocking the flow of water 80 down through pipe 74. Hoop 30 aids in properly positioning disc 22 during such rotation.

Figure 3:
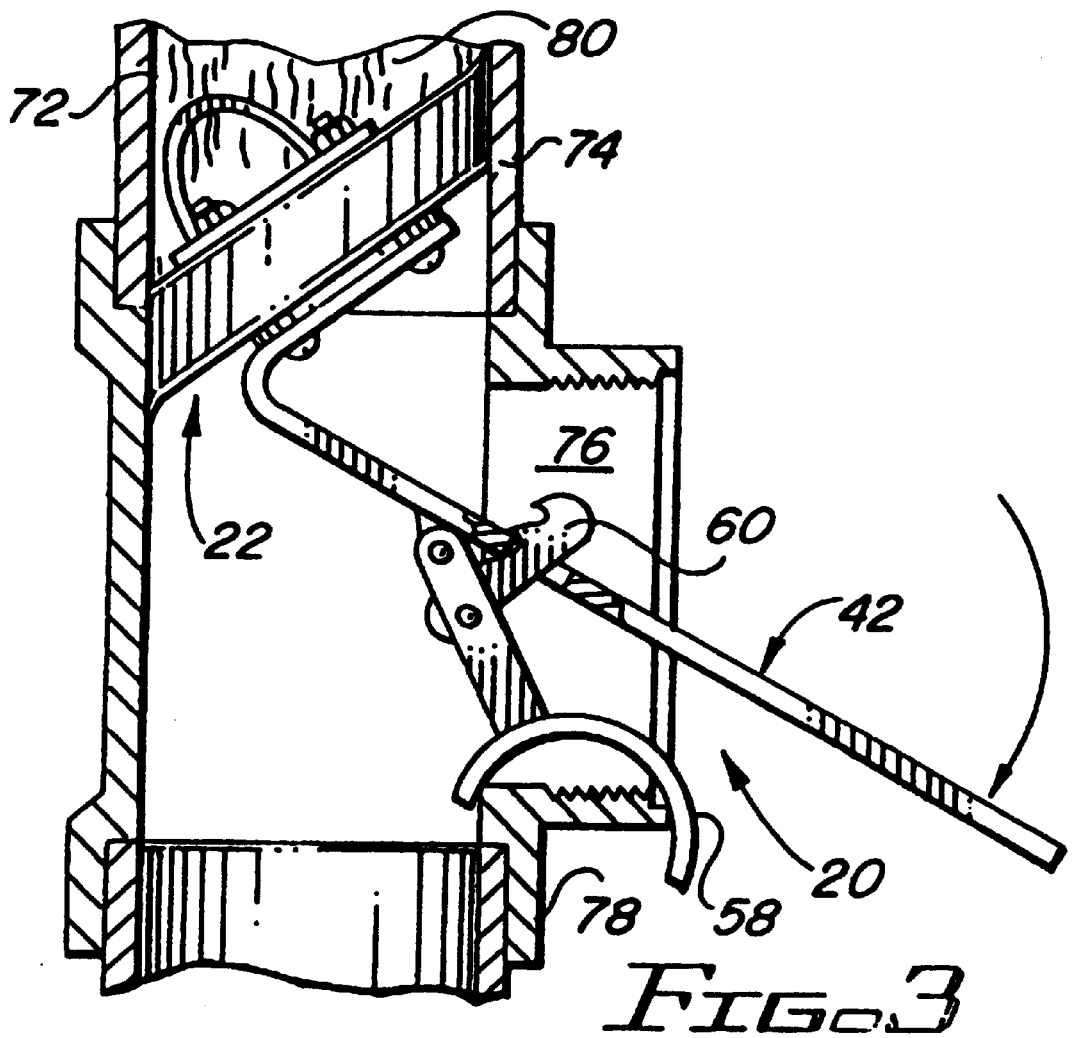
FIG. 3 is a schematic side elevation, partly broken away and partly in section, of the device of FIG. 1, showing the device in the fully seated locked position completely blocking the drain hole.

During the described movement of portion 44 downward and after foot 58 is seated on rim 78, lock arm 60 moves progressively upward to a position where lock notch 64 engages area 68 of portion 44 of lever arm 42 to hold disc 22 in the fully sealed position of FIG. 3. A head of water 80 can then be run into drain pipe 74 above disc 22 without any danger of it running out hole 76 or down below disc 22. Spring 70 keeps device 20 positively locked.

After the lines in the structure connected to drain pipe 74 above disc 22 are examined for-leaks, the test can be terminated and head of water 80 can be slowly bled down drain pipe 74 without causing it to exit hole 76. This is accomplished by pushing portion 44 of arm 42 down slightly to relieve the spring tension on lock arm 60 and manipulating lock arm 60 to move lock notch 64 out of engagement with area 68, then moving portion 44 up until drain notch 66 engages area 68, then letting go of lever arm 42.

Figure 4:
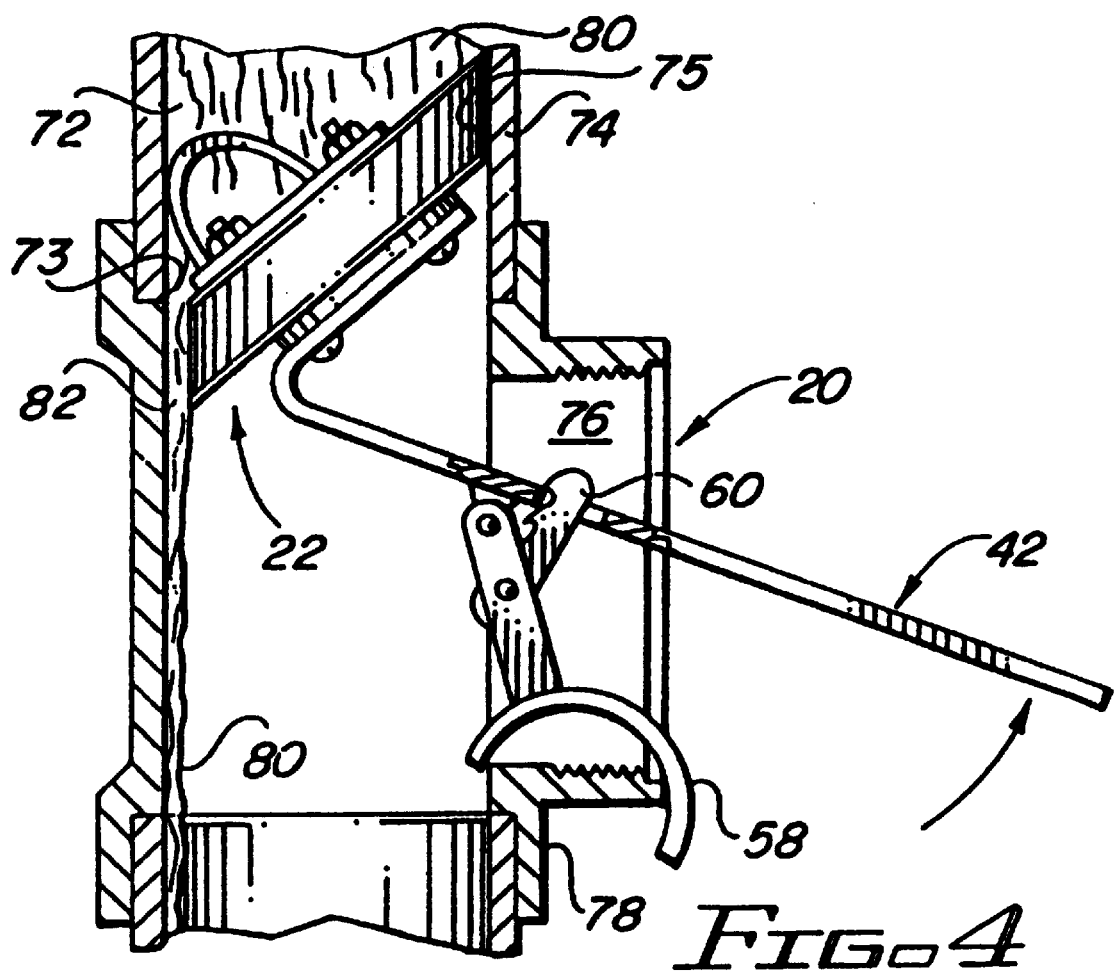
FIG. 4 is a schematic side elevation, partly broken away and partly in section, of the device of FIG. 1, showing the device in the test water bleeding position.

This places disc 22 in the position shown in FIG. 4 wherein leading end 46 of disc 22 still seals off the side of drain pipe containing hole 76, but trailing end 48 of disc 22 has been rotated away from the wall of drain pipe to which it previously was sealed. This leaves a water drain gap 82 therebetween, so that water 80 runs down that wall of drain pipe 74, but not out of access hole 76, as shown in FIG. 4. During this rotation, hoop 30 serves to cam leading end 46 of disc 22 away from one side of the inside wall 73 of pipe 74, while maintaining contact of the tracking end 48 of disc 22 with the opposed wall 75 of pipe 74, thereby providing drain gap 82.

After water 80 has been completely drained from pipe 74, portion 44 can be swung slightly down to relieve tension on notch 66, which can then be disengaged from area 68, after which portion 44 is raised to the position of FIG. 1 and device 20 is removed from hole 76.

Device 20 therefore not only easily and completely seals off drain pipe 74 and is positively locked in place, but it also provides a test water bleed-off feature which further improves the convenience and ease with which device 20 can be used.

It will be understood that disc 22 can be made in a suitable size to fit any desired diameter of drain pipe and disc 22 can be changes on device 20 by removing nuts 36 from bolts 34 and substituting a different disc 22 with attached hoop 30.

Alternatively, hoop 30 from the original disc 22 can be used with the substitute disc 22. It is preferred to grease rim 28 to aid in the seating and sealing of disc 22 against the inner walls of drain pipe 74 and to prevent abrading of rim 28 during insertion and removal of device 20.

The angle of rim 28 with respect to surfaces 24 and 26 can be any suitable angle which will facilitate seating, sealing and bleed-off functions described above. An angle of about 20°–25° from perpendicular is usually used in device 20. The components of device 20 can be made in any suitable size and shape and of any suitable strong durable materials, such as steel for all parts except disc 22 which is usually rubber or rubber-like plastic.

FIGS. 6–9

A second preferred embodiment of the improved device of the present invention is schematically depicted in FIGS. 6–9. Thus, device 20a is shown. Components thereof similar to those of device 20 bear the same numerals but are succeeded by the letter "a".

Device 20a differs from device 20 only in that lock arm 60a contains a single notch, that is, lock notch 64a rather than an additional notch which functions as a bleed-off function described for device 20.

Various other modifications, changes, alterations and additions can be made in the improved device of the present invention, its components and parameters. All such modifications, changes, alterations and additions as are within the scope of the appended claims form part of the present invention.

What is claimed is:

1. A plug assembly for plugging a drain pipe having a generally cylindrical surface of predetermined diameter comprising:
   a plug;
   a handle coupled to the plug for positioning a peripheral edge of the plug in sealing contact with the inner surface of the pipe; and
   a support arm pivotally attached at one end to the handle and having an opposite end for releasably engaging the drain pipe.

2. A plug assembly as recited in claim 1 wherein the peripheral edge is an oblique cylindrical section.

3. A plug assembly as recited in claim 1 wherein the plug is made of an elastomeric material.

4. A plug assembly as recited in claim 1 further comprising a lever arm coupled to the plug, wherein the lever arm is capable of releasably locking the plug in an intermediate position wherein only a portion of the peripheral edge is in sealing contact with the inner surface of the pipe.

5. A plug assembly as recited in claim 1 further comprising:
   a first section on the peripheral edge opposite a second peripheral edge section; and
   a member coupled to the surface of the plug for engaging the inner surface of the pipe thereby keeping the first section in sealing contact with the pipe inner surface when the second section is disengaged from the pipe inner surface.

6. A plug assembly for plugging drain pipes having a cylindrical inner surface, the assembly comprising:
   a plug having an upper surface and a lower surface spaced apart from the upper surface and a peripheral surface therebetween, each of said upper and lower surfaces having an arcuate peripheral edge, said lower edge being laterally displaced relative to the upper surface;
   a handle coupled to the lower surface for introducing the plug into the pipe and manipulating the plug within the pipe so that the peripheral surface of the plug sealingly engages the inner surface of the pipe; and
   a support arm pivotally attached at one end to the handle and having an opposite end for releasably engaging the pipe.

7. An assembly as recited in claim 6 herein the upper surface is parallel to the lower surface.

8. An assembly as recited in claim 6 wherein the plug is made of an elastomeric material.

9. A plug assembly for plugging drain pipes having a side opening, said plug assembly comprising:
   a plug;
   a handle coupled to the plug; and
   a support arm pivotally attached at one end to the handle and having an opposite end for releasably engaging the pipe about the side opening.

10. A plug assembly as recited in claim 9 wherein the plug comprises a peripheral edge surface, wherein the peripheral edge surface forms an oblique cylindrical section.

11. A plug assembly for plugging a drain pipe to allow for fluid pressurization of the drain pipe comprising:
   a plug having an upper surface, a lower surface and a peripheral edge surface defined therebetween, wherein the plug expands radially when exposed to fluid pressure; and
   a member coupled to the plug for engaging the inner surface of the drain pipe to cause a first portion of the plug to be in sealing contact with the drain pipe inner surface when a second portion of the plug is disengaged from the drain pipe inner surface.

12. A plug assembly for plugging a drain pipe having an inner generally cylindrical surface, the assembly comprising:
   a plug having an upper surface, a lower surface and a peripheral edge surface formed therebetween for sealingly engaging the inner surface of the pipe, wherein the peripheral edge surface comprises a first section opposite a second section; and
   a member coupled to the plug for engaging the inner surface of the pipe to keep the first section in sealing contact with the pipe inner surface when the second section is disengaged from the pipe inner surface.

13. A plug assembly as recited in claim 12 further comprising a handle for positioning the plug in a sealing position and an intermediate position within the pipe.

14. A plug assembly as recited in claim 12 wherein the member has a convex outer surface for contacting the inner surface of the pipe.

15. A plug assembly as recited in claim 14 further comprising
   a releasably locking lever arm which is capable of maintaining the plug in a sealing position within the pipe.

16. A plug assembly as recited in claim 15 further comprising an upper plate mounted to the upper surface.

17. A plug assembly for plugging drain pipes from a side opening comprising:
   a plug;
   a handle coupled to the plug;
   a pivot arm having two ends, a first end pivotally connected about the handle and a second end for engaging the pipe about the side opening; and
   a lock arm coupled to the pivot arm and the handle for locking the position of the handle relative to the pivot arm.

18. A method for plugging a pipe having an inner surface and an inner diameter wherein:

a plug having arcuate upper and lower surfaces, and a peripheral edge surface therebetween is positioned in the pipe so that the peripheral edge surface sealingly engages the inner surface of the pipe; and a protruding member coupled to the plug for engaging the inner surface of the pipe.

19. A method as recited in claim 18 wherein the plug is elliptical, having a minor axis and a major axis.

20. A method as recited in claim 19 wherein the plug is positioned in the pipe such that a portion of the peripheral edge surface on each side of the minor axis makes contact with the pipe inner surface.

21. A method as recited in claim 20 wherein the plug is rotated about an axis parallel to its minor axis so that the entire peripheral edge surface sealingly contacts the inner surface of the pipe.

22. A method as recited in claim 21 wherein the plug is rotated by moving a handle which is coupled to the plug.

23. A method as recited in claim 22 wherein the handle is coupled to the lower surface of the plug and has two portions angled relative to each other about the rotating axis.

24. A method as recited in claim 18 wherein the plug has an upper surface and a lower surface spaced apart from the upper surface and wherein the upper surface is laterally displaced relative to the lower surface.

25. A method as recited in claim 24 wherein a peripheral edge surface is in the form of an oblique cylindrical section.

26. A method as recited in claim 18 wherein only a portion of the peripheral edge surface is sealingly engaged to the inner surface of the pipe.

27. A method as recited in claim 18 wherein pressure is released from within the pipe by:

rotating the plug such that the protruding member engages the inner surface of the pipe; and the protruding member keeps a first portion of the peripheral edge surface away from the inner surface of the pipe while maintaining a second portion of the peripheral edge surface in sealing contact with the inner surface of the pipe.

28. A method as recited in claim 18 wherein the plug expands radially to enhance a seal between the plug and the inner surface of the pipe.

29. A method as recited in claim 18 wherein the plug is radially expanded by compressing the plug.

30. A method as recited in claim 29 wherein the plug is compressed by fluid pressure within the pipe.

31. The plug assembly of claim 9 wherein the handle has the capability to pivot about the support arm to allow the plug to be positioned within the drain pipe.

32. The plug assembly of claim 14 further comprising a lower plate coupled to the lower surface and the handle, and wherein the lower plate has the capability to cause the plug to expand radially when the plug is exposed to fluid pressure while in a sealing position within the pipe.

* * * * *